Nov. 2, 1965  E. HÄUSSERMANN  3,215,894
ELECTRIC RAZORS WITH PROTECTIVE VOLTAGE-SENSING MEANS
Filed July 10, 1962  2 Sheets-Sheet 1
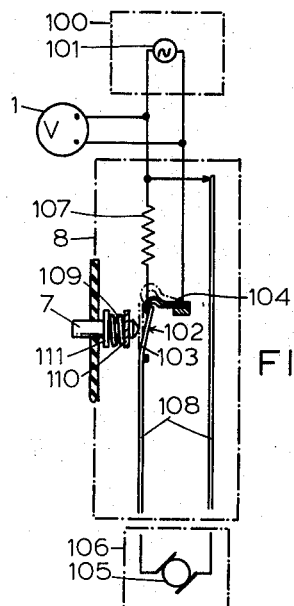
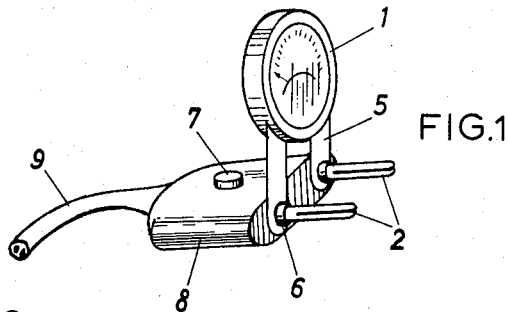
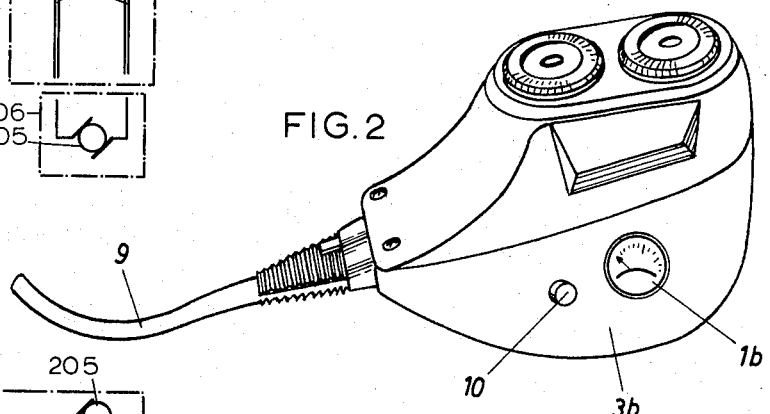
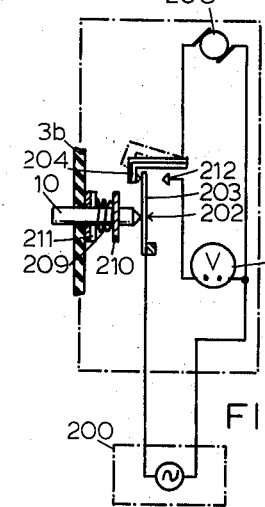
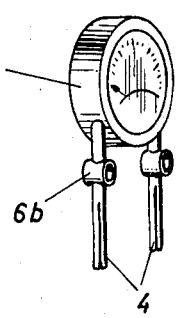
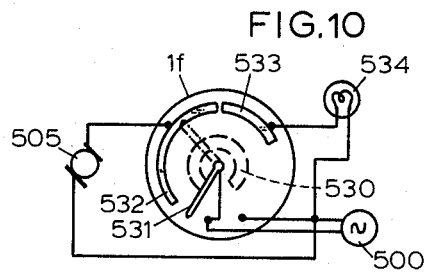
ERICH HÄUSSERMANN
INVENTOR.
BY Karl F. Ross
AGENT Nov. 2, 1965    E. HÄUSSERMANN    3,215,894
ELECTRIC RAZORS WITH PROTECTIVE VOLTAGE-SENSING MEANS
Filed July 10, 1962    2 Sheets-Sheet 2

ERICH HÄUSSERMANN
INVENTOR.

BY  Karl F. Ross

AGENT

United States Patent Office 3,215,894
Patented Nov. 2, 1965

3,215,894
ELECTRIC RAZORS WITH PROTECTIVE
VOLTAGE-SENSING MEANS
Erich Häussermann, Santisstrasse 22, Uberlingen
(Bodensee), Germany
Filed July 10, 1962, Ser. No. 208,849
1 Claim. (Cl. 317—13)

My present invention relates to electric razors and, more particularly, to electric dry-shaving apparatus having an electric motor and circuit means for connecting this motor with a source of electromotive potential.

It is well known that dry-shaver apparatus of the aforementioned type are frequently carried by travelers from location to location are provided with line cords connectable to the electric network at each location. Often the potentials or voltages of such networks vary from place to place, thereby subjecting the razor of the unaware traveler to the possibility that the motor, which is designed to be operated at or below a predetermined maximum potential, will burn out. Moreover, at certain localities the potential of the electrical network fluctuates greatly depending upon load and other considerations so that, from time to time, a temporary rise in the line voltage may be experienced.

It is an object of the present invention to provide an improved razor apparatus adapted to avoid the aforementioned disadvantages.

According to a feature of my invention an electric dry-shaving apparatus comprising an electric motor, a housing therefor, and circuit means for connecting this motor with the source of electromotive potential, is provided with voltage-sensing means operatively connected with the circuit means and responsive to the voltage of the source for enabling disconnection of the motor from the source upon the voltage exceeding a predetermined maximum. The voltage-sensing means may, advantageously, include a voltage indicator, such as a voltmeter, connected across the source or line for providing a visual indication of the prevalent voltage. The sensing means may also include circuit-breaker means for de-energizing the motor upon the detection of a voltage exceeding the aforementioned maximum.

According to a more particular feature of the invention, manually operable switch means are provided for alternately connecting the voltmeter or other voltage indicator (e.g. a glow lamp) and the motor across the source to permit testing of the source potential. Such switch means may be provided on the body or housing of the electric razor or in a plug for connecting the electric cord of the razor with an outlet forming part of the network. The voltage-indicating means may also be mounted directly in the housing or upon the plug. In the latter case, the voltmeter may be provided with a pair of conductive terminals formed with holes adapted to receive the conductive prongs of the plug. Moreover, both the voltage-indicating means and circuit-breaker means, which individually or together form the voltage-sensing device, may be detachably secured to the housing or body of the razor.

Thus, the circuit-breaker may be provided in the plug or elsewhere along the line cord which is detachably connected to the razor housing. The voltmeter may likewise be provided with means for removably securing it to the housing. Advantageously, the circuit-breaker is provided with resetting means including a manually operable actuating member, such as a spring-loaded knob or button, for re-establishing a connection between the motor and the source.

Other objects, features and advantages of the present invention will become more readily apparent from the following detailed description, reference being made to the accompanying drawing in which:

FIG. 1 is a perspective view of the plug and line cord of a dry-shaving apparatus according to the instant invention;

FIG. 2 is a perspective view of an apparatus of a rotary-blade shaving apparatus embodying the invention;

FIG. 3 is a perspective view of a voltage-sensing device;

FIGS. 6–9 are circuit diagrams of the voltage-sensing means of each of the embodiments of FIGS. 1, 2, 4 and 5, respectively; and FIG. 10 is a circuit diagram showing still another voltage-sensing device according to the invention.

Figure 4:
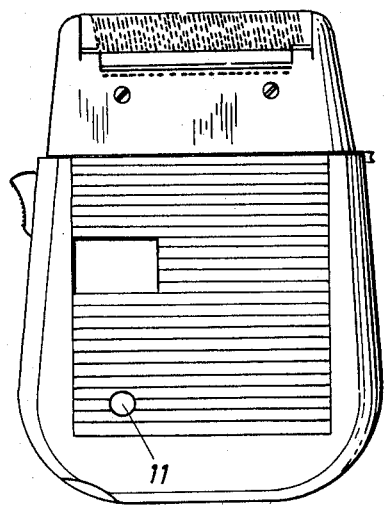
FIG. 4 is a front-elevational view of an oscillatory blade shaver showing the actuating member of its switch means.

In FIG. 1 I show the plug 8 of a dry shaver line cord 9, the prongs 2 of which pass through eyes or holes 6 formed at the extremities of a pair of terminals 5 extending from a voltage-sensing instrument such as the voltmeter 1. The prongs 2 are provided with bosses 2' adapted to fit snugly into the openings 6. Thus, the voltmeter 1 may be removably mounted upon the prongs 2 of the plug 8 whereupon this plug can be inserted into the outlet (not shown) of the usual electrical network. The user of the razor will then obtain in immediate indication of the voltage prevalent in the network.

Immediately upon detecting a voltage in excess of the predetermined maximum, as read from the voltage-sensing voltmeter 1, the user can pull out the plug 8 from its socket to disconnect the razor and prevent damage to the motor. In this connection it may be noted that the plug 8 is usually provided at one end of the line cord 9 whose other end may be removably connected to the body of the razor. It is, therefore, possible, prior to connecting the end of the cord remote from plug 8 to the razor, to insert the plug in its socket in order to test the voltage. I prefer, however, to provide the plug 8 with circuit-breaker means, which is resettable by a push button 7, for open-circuiting the load in the event the cord is permanently attached to the razor or has inadvertently been connected thereto prior to insertion of the plug in the outlet.

In FIG. 6 I show the circuit of the device illustrated in FIG. 1. The power network 100, represented as a generator 101, is bridged by the voltmeter 1 affixed to the prongs of the plug 8 schematically represented in FIG. 6. This plug contains the circuit-breaker 102 which is resettable by the push button 7. Circuit-breaker 102 comprises a conductive contact strip 103 which is fixed at one end and is resiliently biased toward its dot-dash position. A bimetallic catch 104 secures the strip 103 against displacement into its dot-dash position in the absence of a voltage exceeding the rating of the motor 105 of razor 106. A loading resistor 107 whose impedance is substantially higher than that of motor 105 is connected in series with the bimetallic hook-shaped member 104 across the source 101.

When the plug is inserted into a socket of an electrical network having a supply voltage in excess of the rated voltage of the motor 105, a current is drawn through the bimetallic element 104 and resistor 107 which causes heating of the bimetallic element and a consequent bending thereof into the dot-dash position shown in FIG. 6. The contact 103 is then released thus open-circuiting line 108. When the element 104 cools, the circuit-breaker 102 may be reset by depressing button 7 against the force of a restoring spring 109 which bears against a fixed support 110 and a shoulder 111 carried by the button. Contact 103 then springs past the hook of element 104 and is re-engaged by the latter. If the plug 8 is not withdrawn from the outlet having the incorrect supply voltage, bimetallic element 104 will remain heated and in its disengaged position to prevent any energization of motor 105. It should be noted that the circuit-breaker of plug 8 is, unlike conventional circuit-breakers which rely for their actuation upon the passage of an excess current through the load they are designed to protect, operative even when the plug is disconnected from the razor 106. It should also be noted that the voltmeter 1 may be connected to the prongs 2 by means other than the aperture terminals 5; clips, soldering etc. have been found to be effective means for connecting the voltmeter across the line.

In FIG. 3 I show another voltmeter 1c which is provided with prongs 4 adapted to be inserted into the outlet. The prongs are formed with eyes 6b, which may be insulated along their outer surfaces, into which the prongs 2 of the plug 8 can be inserted. The prongs 4 can also serve to removably connect the voltmeter with the shaver body. In this connection, it is pointed out that plug 8 may equally be employed at the junction of the line cord 9 with the razor and that the voltmeter 1 or 1c may be provided adjacent the razor rather than remote therefrom as described with reference to FIG. 1. When the voltmeter shown in FIG. 3 is employed, it may be inserted into the outlet prior to the attachment of the line cord thereto in order to test the voltage.

In FIG. 2 I show a rotary-blade electric razor of a conventional type which is provided, according to the invention, with a voltage-sensing mechanism comprising a voltmeter 1b and a switch mechanism operated by a push button 10 in the body or housing 3b of the razor. Current is supplied to the latter by the usual line cord 9.

As indicated in FIG. 7, the voltage-supply network 200 feeds the razor 3b which contains the voltmeter 1b and the motor 205 of the razor. A combination circuit-breaker and switch-mechanism 202 is provided to permit the voltmeter 5 to be connected temporarily across the source 200. This mechanism comprises a fixed contact 212 of a switch whose spring-blade contact 203 may be brought into engagement with the contact 212 upon depression of the push button 10 against the force of its restoring spring 209. The latter bears against a fixed member 210 and a shoulder 211 of the button. Contact blade 203 is normally held in its solid-line position by a bimetallic catch 204 which serves as a countercontact through which current is supplied to the motor 205. In the event that the voltage of source 200 exceeds the predetermined maximum of motor 205, excess current will be drawn through the motor circuit to heat the bimetallic element 204 and bend same into its dot-dash position, thereby releasing the blade 203 as described with reference to FIG. 6. To insure that the high voltage is not again placed upon the motor 205, the reset button 10 is fully depressed to close the contacts 203, 212, thereby connecting the voltmeter 1b across the source 200. Upon reading a voltage in excess of the rating of the motor on this voltmeter, the user will then disconnect the razor. Release of push button 10 will restore the circuit-breaker to its initial condition since contact 204, having been removed from the circuit, cools and returns to its solid line position. Generally, however, the user will test the voltage of the course by holding the button 10 in its fully depressed position while inserting the plug of the line cord 9b into the outlet. He may thus read the voltage and determine whether it exceeds the rating of the motor before he releases the button 10 to start the shaver motor 205. If the user suspects that a voltage fluctuation may be present in the supply network, he will periodically depress the button 10 to take readings on the voltmeter. A circuit such as that shown in FIG. 7 may also be housed in the plug of the apparatus.

Figure 8:
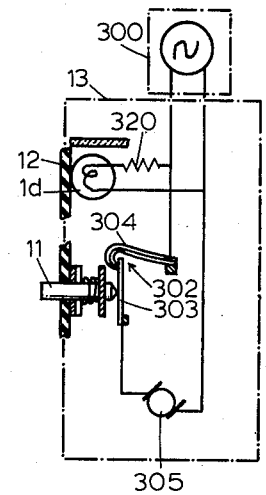

In FIG. 4 I show an oscillatory blade razor which is provided with a spring-loaded circuit-breaker button 11 and a voltage-indicating lamp best seen in FIG. 8. In the circuit of this embodiment, the lamp 1d serves to indicate a voltage in excess of the rated voltage of the motor 305 and is connected across the supply network 300 in series with a resistor 320 preventing illumination of the lamp until the rated voltage of the motor is reached. To permit viewing of the lamp a window 12 is provided in the housing 13 of the shaver. The motor 305 is also connected in series with an overload-type circuit-breaker 302 whose blade contact 303 is normally engaged by the bimetallic hook-shaped element 304. This circuit-breaker operates similarly to that of FIG. 6 with the push button 11 serving to reset it upon release of the blade 303 by element 304 as a consequence of an overloading of the motor 305.

Figure 5:
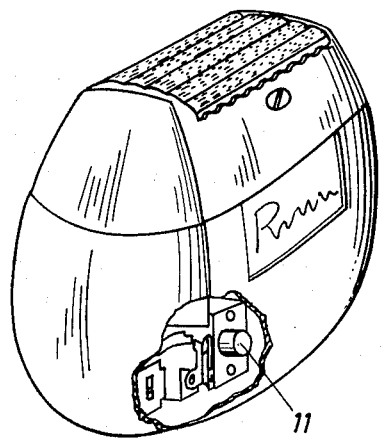
FIG. 5 is a perspective view, partly broken away, of another oscillatory blade shaver showing its circuit-breaker.
Figure 9:
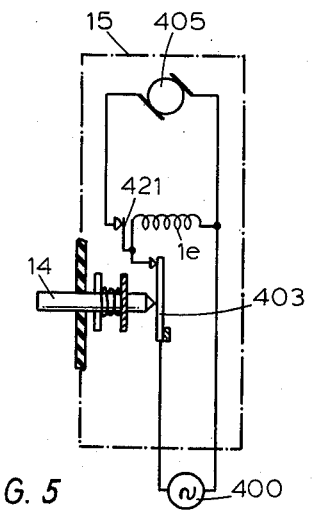

FIG. 5 shows another oscillatory blade shaver, of a conventional type, which is provided with voltage-sensing and circuit-breaker means according to the invention. A push button 14 effects resetting of the system. The housing 15 of this razor contains the usual motor 405 (FIG. 9), which is representative of any magnetic device for actuating the blades, connected in series with a pair of contacts 421 across the source 400. The normally closed contacts 421 may be opened by a voltage-sensitive relay 1e, whose threshold is above the rated voltage of the motor 405 and which is connected in series with a spring-blade contact 403 displaceable by the push button 14. When the voltage of source 400 is below the rated maximum of motor 405, the latter is energized through the normally closed contacts 421. A voltage in excess of the maximum will, however, energize relay 1e to open the contacts 421 and de-energize motor 405. As long as the voltage exceeds the maximum, relay 1e will remain open to prevent damage to the motor. Since a relay of this type may be maintained in its energized state by a voltage substantially less than that required to trip it initially, push button 14 may be depressed from time to time to open-circuit the relay and the motor in order to determine whether the voltage has fallen again to a safe value.

In FIG. 10 I show a voltmeter 1f which simultaneously serves as the circuit-breaking means of the invention. In this embodiment the voltmeter 1f with its usual D'Arsonval movement 530 has its pointer formed as a wiper 531 adapted to engage the arcuate contact 532 when the voltage of the source 500 across which the voltage meter 1f is connected is below the rated maximum of the razor motor 505. If, however, the voltage exceeds this maximum, wiper 531 will engage a contact 533 further along this path to disconnect the motor 505 and connect a warning light 534 across the source 500. Voltmeter 1f, warning light 534 and motor 505 may all, of course, be built into the voltmeter.

The invention described and illustrated is believed to admit of many modifications and variations within the ability of persons skilled in the art, all such modifications being deemed within the spirit and scope of the appended claim.

I claim:

In an electric razor comprising a housing member and an electric motor in said housing member, the combination therewith of circuit means including a line cord detachable from the housing and a plug member on said line cord for operatively connecting said motor with a source of electric potential; and voltage-sensing means in said plug member operatively connectable with said circuit means in parallel with said motor and responsive to the voltage of said source independently of energization of said motor, said voltage-sensing means including switch means in said plug member in series with said source and said motor operable automatically to prevent energization of said motor from said source, said voltage-sensing means including a voltmeter connectable across said source, said plug member having a body and a pair of parallel conductive prongs projecting from said body and insertable into an outlet, said voltmeter being provided with a pair of conductive terminals extending transversely to said prongs and formed with throughgoing transverse holds adapted to receive said prongs, said voltmeter being mounted upon said prongs proximal to said body whereby the free extremities of said prongs can be inserted into said outlet while said voltmeter is mounted thereon, said switch means having a manually actuatable button protruding from said plug member for manually maintaining a circuit between said prongs and said motor open upon depression of said manually actuatable button.

References Cited by the Examiner
UNITED STATES PATENTS

| | | | |
|---|---|---|---|
| 2,229,955 | 1/41 | Bostroem | 310—47 |
| 2,607,831 | 8/52 | Jones | 317—13 |
| 2,972,708 | 2/61 | Schahefer | 317—13 |

SAMUEL BERNSTEIN, *Primary Examiner.*